Figure 1:
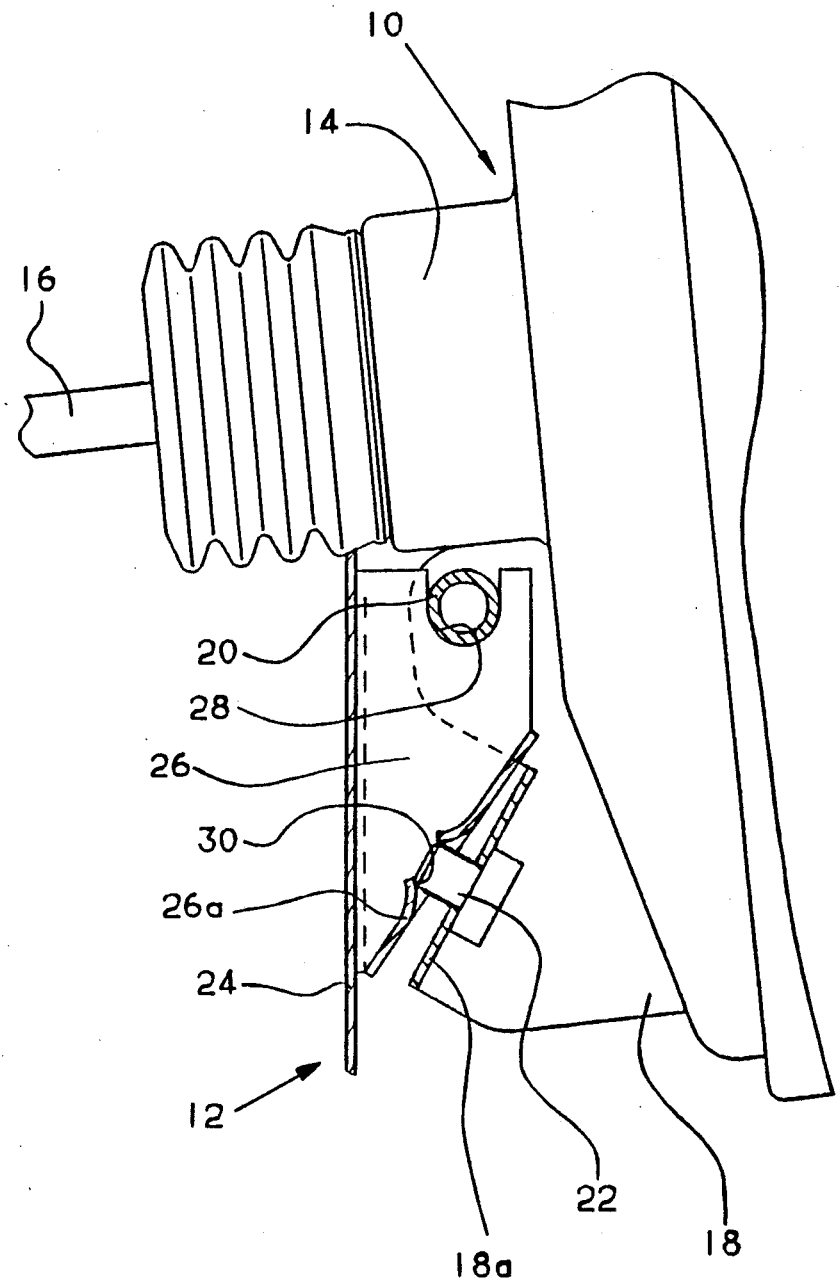

United States Patent [19]

Gautier

[11] Patent Number: 4,944,479

[45] Date of Patent: Jul. 31, 1990

[54] SYSTEM FOR MOUNTING A BOOSTER

[75] Inventor: Jean-Pierre Gautier, Aulnay Sous Bois, France

[73] Assignee: Bendix France, Drancy, France

[21] Appl. No.: 357,448

[22] Filed: May 25, 1989

[30] Foreign Application Priority Data

Jun. 27, 1988 [FR] France ............................. 88 08585

[51] Int. Cl.⁵ ............................................. F04G 5/06
[52] U.S. Cl. ................................. 248/222.2; 248/27.1
[58] Field of Search ................... 248/225.1, 22.2, 27.1, 248/27.3; 74/102, 512; 92/161, 146, 128, 169; 60/547.1

[56] References Cited

U.S. PATENT DOCUMENTS

| | | | |
|---|---|---|---|
| 1,213,641 | 1/1917 | Hickman | 248/222.2 |
| 3,714,780 | 2/1973 | Shellhause | 248/27.1 X |
| 3,766,802 | 10/1973 | Shellhause | 74/512 |
| 3,795,380 | 3/1974 | Turner | 248/222.2 X |
| 4,246,755 | 1/1981 | weiler | 60/547.1 |
| 4,475,337 | 10/1984 | Meynier | 60/547.1 |
| 4,826,121 | 5/1989 | Rossigno | 248/22.2 |

Primary Examiner—J. Franklin Foss
Attorney, Agent, or Firm—Larry J. Palguta; Ken C. Decker

[57] ABSTRACT

In order to mount a booster, such as brake booster (10), on a supporting bracket (26) located in the engine compartment of a motor vehicle, there are, on the same side of the booster and on the front face of the latter, catching members, such as journals (20) received in semicircular recesses (28) of the bracket (26), and mutually confronting bearing faces preferably carrying matching fastening members, such as a rod (22) capable of engaging into a hole (30) irreversibly. Since the booster (10) rests on the recesses (28) as a result of gravity, the engagement of the rod (22) into the hole (20) is obtained by exerting a pushing force (F) on the pushrod (16) of the booster.

7 Claims, 2 Drawing Sheets

SYSTEM FOR MOUNTING A BOOSTER

The invention relates to a system making it possible to mount a booster, such as a brake booster, on a supporting bracket provided for this purpose in the engine compartment of a motor vehicle.

During the assembly-line production of motor vehicles, the ease with which each of the members forming this vehicle is mounted is an important factor because a relatively small time saving in the mounting of some of these elements can result in a considerable increase in the production rate at the end of the line.

This ease of mounting is also significant when some members have to be replaced during the life of the vehicle.

With this in mind, attempts have already been made in the past to make it easier to mount the brake booster. Thus, the document U.S. Pat. No. 4,658,660 provides an original mounting technique, according to which the booster is first attached to a supporting plate by means of a joint of the hinge type located on the front face of the booster and in the upper part of the latter. When the booster is pivoted about this joint, holes made in a tongue formed in the lower part of the booster are thereby brought opposite corresponding internally threaded holes made in the supporting plate. Screws are subsequently introduced into the mutually confronting holes, in order to fix the booster to the supporting plate.

This mounting technique affords a time-saving in relation to the more traditional techniques. However, it still has some disadvantages. In particular, the introduction of the screws after the booster has been pivoted about its joint also leads to a loss of time which it is desirable to avoid. Moreover, the location of the joint makes it necessary to exert a pulling action on the actuating rod of the booster in order to cause the booster to pivot so as to bring the holes opposite one another. This pulling action is opposed to the pushing action normally exerted on this rod from the brake pedal and is consequently difficult to put into effect.

An object of the present invention is, specifically, a system for mounting a booster on a supporting bracket, which allows a further time saving in relation to the system described in the document U.S. Pat. No. 4,658,660, particularly because of the elimination of the last step necessary for activating this latter system and because of a more expedient arrangement of the joint.

According to the present invention, there is provided a system for mounting a booster on a supporting bracket, characterized in that it comprises:

catching members, by means of which the booster can rest on the supporting bracket as a result of gravity, these catching members defining a pivoting axis orthogonal to an actuating rod of the booster; and mutually confronting bearing faces arranged on the same side of the booster as the catching members and capable of being laid against one another under the effect of a pivoting of the booster about said axis, when a pushing force is exerted on the actuating rod.

When this mounting system comprises matching fastening members which automatically fit one into the other when the booster is made to pivot about its pivoting axis, the mounting time is reduced to the placing of the catching members of the booster on the matching catching members of the supporting bracket, and then to the exertion of a sufficient pivoting force to engage the matching fastening members. Furthermore, the relative arrangement of the pivoting axis and of the bearing faces is selected in such a way that the pivoting of the booster ensuring the final fastening of the latter is obtained by exerting a pushing force on the actuating rod, thus simplifying the control of this pivoting.

The catching members and the bearing faces carrying the matching fastening members are located underneath the actuating rod of the booster, in such a way that the fastening members are not subjected to tearing stress.

So that the force exerted on the actuating rod of the booster is just sufficient to ensure the engagement of the matching fastening members, but does not give rise to any risk of damage, the catching members can, in particular, be located approximately half-way between the actuating rod and the matching fastening members.

In a preferred embodiment of the invention, the catching members comprise two aligned journals fixed to a housing of the booster and two semicircular recesses which are formed in the supporting bracket and are open upwards and in which the journals are placed.

Preferably, the fastening members comprise at least one rod fixed to a housing of the booster and an opposite hole made in the supporting bracket and the edge of which is notched and partially bent away from the rod.

Figure 2:
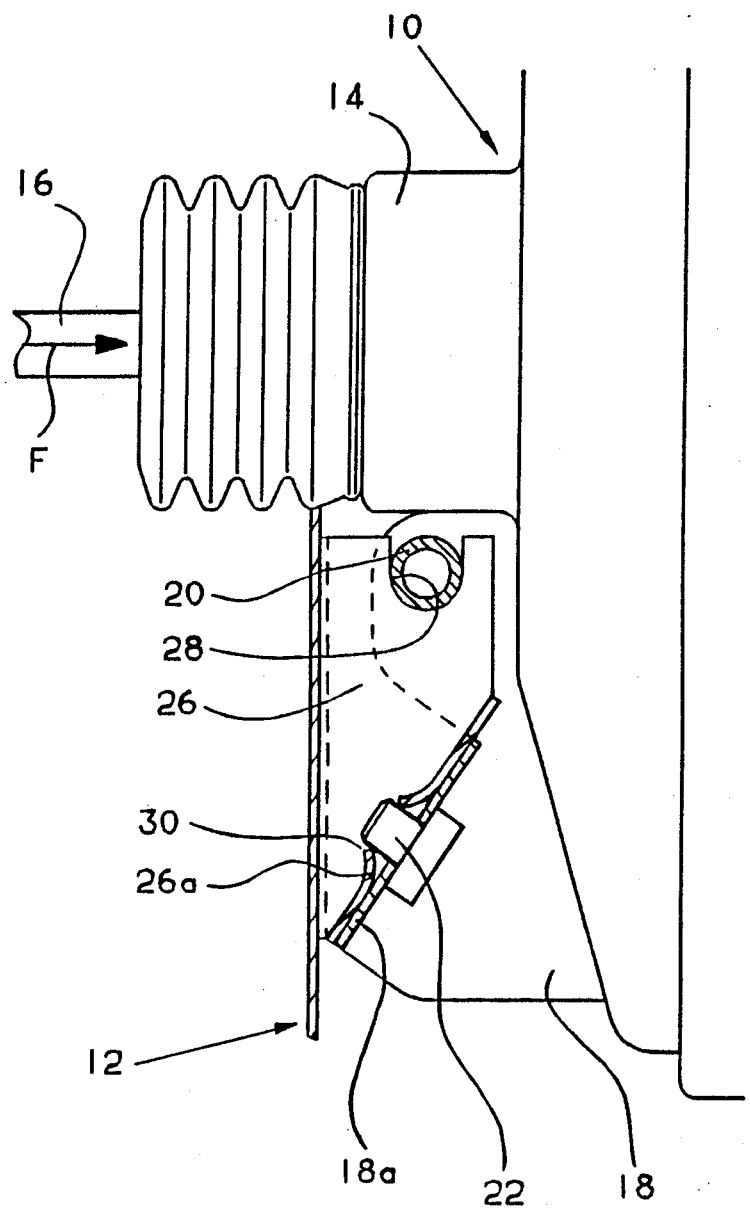

The invention will now be described by way of example with reference to the accompanying drawings in which:

FIG. 1 is a side view, in partial section, showing diagrammatically a mounting system according to the invention before a pivoting of the booster ensures the final fastening of the latter on its supporting bracket; and FIG. 2 is a view comparable to that of FIG. 1, showing the mounting system in its final position, that is to say after the engagement of the matching fastening members.

FIGS. 1 and 2 show only the adjacent parts of a brake booster 10 and of a support 12 provided in the engine compartment of a vehicle in order to support the booster 10 by means of the mounting system according to the invention.

The part of the booster 10 illustrated in FIGS. 1 and 2 corresponds to the rear part of this booster, that is to say to the part located on the same side as the brake pedal (not shown). The Figures show the housing 14 of the booster and the actuating rod 6 which is arranged in the axis of the booster and by means of which the latter is connected to the brake pedal (not shown).

The booster 10, to allow it to be mounted on the support 12, also possesses a plate 18 fastened, for example by welding, to the outside of the housing 14 on the rear face of the latter. The plate 18 is directed radially in relation to the axis of the booster, and it is intended to be placed in a vertical position underneath this axis, as illustrated in FIGS. 1 and 2.

The plate 18, in its part nearest the axis of the booster, supports two aligned journals 20 which project on the two opposite faces of the plate 18 perpendicularly to these. When the plate 18 is directed in the way defined above, the axis which is common to the two journals 20 and which, as will be seen later, forms a pivoting axis of the booster during its mounting is oriented in a horizontal direction orthogonal to the axis of the booster embodied by the actuating rod 16.

The plate 18, in its part furthest from the axis of the booster, has a part 18a bent at right angles in relation to the rest of the plate 18. This approximately plane part 18a forms an acute angle, for example in the neighbourhood of 50°, with the axis of the actuating rod 16 of the booster. Moreover, the part 18a of the plate 18 has, for example at its center, a hole in which is fastened a rod 22 projecting rearwards from this part 18a. In particular, the rod 22 can be fastened in this hole by screwing or by any other suitable means.

The relative arrangement of the journals 20 and of the rod 22 is such that the latter is located approximately in the radial plane passing through the axis of the journals 20 and perpendicular to the axis of the booster 10. Furthermore, the journals 20 are located approximately half-way between the axis of the booster embodied by the actuating rod 16 and the rod 22.

As also illustrated in FIGS. 1 and 2, the support 12 provided for receiving the booster in the engine compartment of the vehicle comprises, in the example shown, a vertical plate 24, to the rear face of which a supporting bracket 26 is fastened by any suitable means, such as by welding. This bracket 26 comprises two parallel plane parts which are directed perpendicularly relative to the plate 24 and the upper edges of which have two aligned semicircular recesses 28 open upwards. The diameter of these recesses 28 is equal to the outside diameter of the journals 20, so that these can rest in the bottom of the recesses 28 as a result of gravity, as illustrated particularly in FIG. 1.

The bracket 26 likewise has a bent part 26a, the orientation and arrangement of which are such that, when the journals 20 are received in the recesses 28, a front bearing face of the bent part 18a of the plate 18 can come to bear against a rear bearing face of this bent part 26a of the bracket 26, as illustrated in FIG. 2. Under these conditions, the axis of the booster embodied by the actuating rod 26 is horizontal.

The bent part 26a of the bracket 26 has, for example, in its central part, a hole 30, the diameter of which is much less than that of the rod 22. The edge of this hole 30 is notched with radial slits and bent partially rearwards, as illustrated in FIG. 1. Moreover, this hole 30 is aligned axially with the rod 22 when the journals 20 are received in the semicircular recesses 28.

As a result of the characteristics of the mounting system according to the invention which have just been described, it becomes much easier to mount the booster 10 on the support 12.

Thus, to carry out this mounting, it is sufficient initially to place the booster 10 on the supporting bracket 26, in such a way that the journals 20 rest in the semicircular recesses 28 as a result of gravity (FIG. 1). A pivoting axis located underneath the actuating rod 16 of the booster is thus defined between the booster and the supporting bracket.

It is then sufficient for an operator to exert a pushing force F (FIG. 2) on the pedal (not shown) located at the end of the actuating rod 16, in order to cause the booster to pivot about this pivoting axis in the direction corresponding to the engagement of the rod 22 into the hole 30. When a force F sufficient for force-fitting the rod 22 into the hole 30 is exerted on the brake pedal, the booster 10 is thus fastened to the support 12 finally and irreversibly.

As has already been mentioned, the mounting system according to the invention therefore makes it possible to reduce the mounting time for the booster considerably and simplify this mounting.

It will easily be appreciated that the invention is not limited to the specific embodiment just described, but embraces all its alternative forms.

In particular, the assembly consisting of the two journals 20 and of the semicircular recesses 28 can be replaced by any equivalent assembly formed from catching members allowing the booster to rest on the supporting bracket as a result of gravity, while at the same time forming a pivoting axis for the booster.

In a comparable way, the assembly consisting of the rod 22 and of the hole 30 can comprise several rods and several holes. This assembly can also be omitted or replaced by any equivalent assembly consisting of any fastening members, preferably capable of engaging one into the other irreversibly.

Finally, even though the arrangement of the mounting system in the lower part of the booster is easier to put into practice, the catching members, the bearing faces and the fastening members could be located differently in relation to the axis of the booster, without departing from the scope of the invention.

We claim:

1. A system for mounting a booster on a supporting bracket, comprising:
    catching members by means of which the booster rests on the supporting bracket as a result of gravity, said catching members defining a pivoting axis orthogonal to an actuating rod of the booster,
    bearing faces arranged on the same side of the booster as the catching members and capable of being laid against one another under the effect of pivoting of the booster about said axis when a pushing force is exerted on the actuating rod, and
    fastening members which keep the bearing faces against one another, the fastening members extending irreversibly one into another.

2. The mounting system according to claim 1, wherein the catching members and the bearing faces are located underneath the actuating rod of the booster.

3. The mounting system according to claim 2, wherein the catching members are located approximately half-way between the actuating rod and the bearing faces.

4. The mounting system according to claim 1, wherein the catching members and the bearing faces are located underneath the actuating rod of the booster.

5. The mounting system according to claim 4, wherein the catching members are located approximately half-way between the actuating rod and the bearing faces.

6. The mounting system according to claim 1, wherein the fastening members comprise at least one rod supported by a plate which is fixed to a housing of the booster and on which one of the bearing faces is formed, and an opposite hole made in a plate of the supporting bracket on which the other bearing face is formed, the edge of the hole being notched and partially bent away from the rod.

7. The mounting system according to claim 1, wherein the catching members comprises two aligned journals fixed to a housing of the booster and two semicircular recesses which are formed in the supporting bracket to open upwardly and in which the journals are received.

* * * * *